United States Patent
Allen

(10) Patent No.: US 9,507,943 B1
(45) Date of Patent: Nov. 29, 2016

(54) ANALYSIS TOOL FOR DATA SECURITY

(71) Applicant: Amazon Technologies, Inc., Seattle, WA (US)

(72) Inventor: Nicholas Alexander Allen, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 263 days.

(21) Appl. No.: 13/770,390

(22) Filed: Feb. 19, 2013

(51) Int. Cl.
*G06F 21/56* (2013.01)
*G06F 21/57* (2013.01)

(52) U.S. Cl.
CPC ............. *G06F 21/577* (2013.01); *G06F 21/56* (2013.01)

(58) Field of Classification Search
None
See application file for complete search history.

(56) References Cited

U.S. PATENT DOCUMENTS

| 2010/0031353 | A1* | 2/2010 | Thomas | G06F 11/3604 726/22 |
| 2011/0239294 | A1* | 9/2011 | Kim et al. | 726/22 |
| 2013/0160127 | A1* | 6/2013 | Jeong et al. | 726/24 |

OTHER PUBLICATIONS

Lucca et al., Identifying Cross Site Scripting Vulnerabilities in Web Applications, IEEE, 2004.*
Moser et al., Exploring Multiple Execution Paths for Malware Analysis, IEEE, 2007.*
Tzermias et al., Combining Static and Dynamic Analysis for the Detection of Malicious Documents, ACM, 2011.*
Vogt et al., Cross-Site Scripting Prevention with Dynamic Data Tainting and Static Analysis, Internet Society, 2007.*
Webpage: "Websecurify", Overview screen [online][retrieved on Feb. 19, 2013],retrieved from http://websecurify.com/static/images/overview.screen.01.png 1 pp.
Web article: "XSS Rays" [online][retrieved on Feb. 19, 2013],retrieved from https://chrome.google.com/...-rays/kkopfbcgaebdaklghbnfmjeeonmabidj/details?hl=en-GB#detail/xss-rays/kkopfbcgaebdaklghbnfmjeeonmabidj/details?hl=en-GB , 6 pps.

* cited by examiner

*Primary Examiner* — Minh Dinh
(74) *Attorney, Agent, or Firm* — Lee & Hayes, PLLC; Charles L. Warner

(57) ABSTRACT

Technologies are described herein for an analysis tool for data security. An analysis tool can be configured to analyze data using a dynamic analysis and a static analysis. During the dynamic analysis, test execution paths can be executed against the data to track dynamic flows corresponding to execution paths through the data and to track variable values for variables referenced during the dynamic analysis. During the static analysis, possible program execution paths can be identified. The dynamic flows can be mapped to the static flows and a taint status of the variables associated with the mapped dynamic flows can be evaluated. Based upon the taint status, the analysis tool can identify potentially unsafe static flows.

28 Claims, 8 Drawing Sheets

ANALYSIS TOOL FOR DATA SECURITY

BACKGROUND

Web content such as web sites and web applications sometimes includes various client-side scripts that execute at a client device during display and/or interaction with the web content. These scripts can include, for example, various instances of browser-side and/or client-side code that can be executed by a computing device to provide various functions. For example, a client-side script may be executed by a computing device to access data and/or resources of a computing device for various reasons.

Execution of some client-side scripts, however, may be influenced by a device executing the scripts. Such influence can be exploited to execute various attacks against the computing device and therefore may be viewed as vulnerabilities. Some developers may examine scripts to identify such vulnerabilities and/or conditions that may result in these vulnerabilities. As such, some scripts may be analyzed and/or tested by developers to identify and repair various vulnerabilities.

Because consumers may execute applications and/or access other web content with an increasingly diverse set of devices, browser software, and/or device platforms, and because these and other aspects of the computing device can affect execution of the code, the task of testing web content such as scripts for vulnerabilities may be difficult. For example, code developed by a developer may include and/or be affected by hidden functionality that may be influenced by the device, the browser, or the like. Thus, a single test environment such as one platform, operating system, browser application, execution environment, or the like, may not provide an accurate representation of how the program/script will be executed in varying user environments.

DETAILED DESCRIPTION

Figure 1:
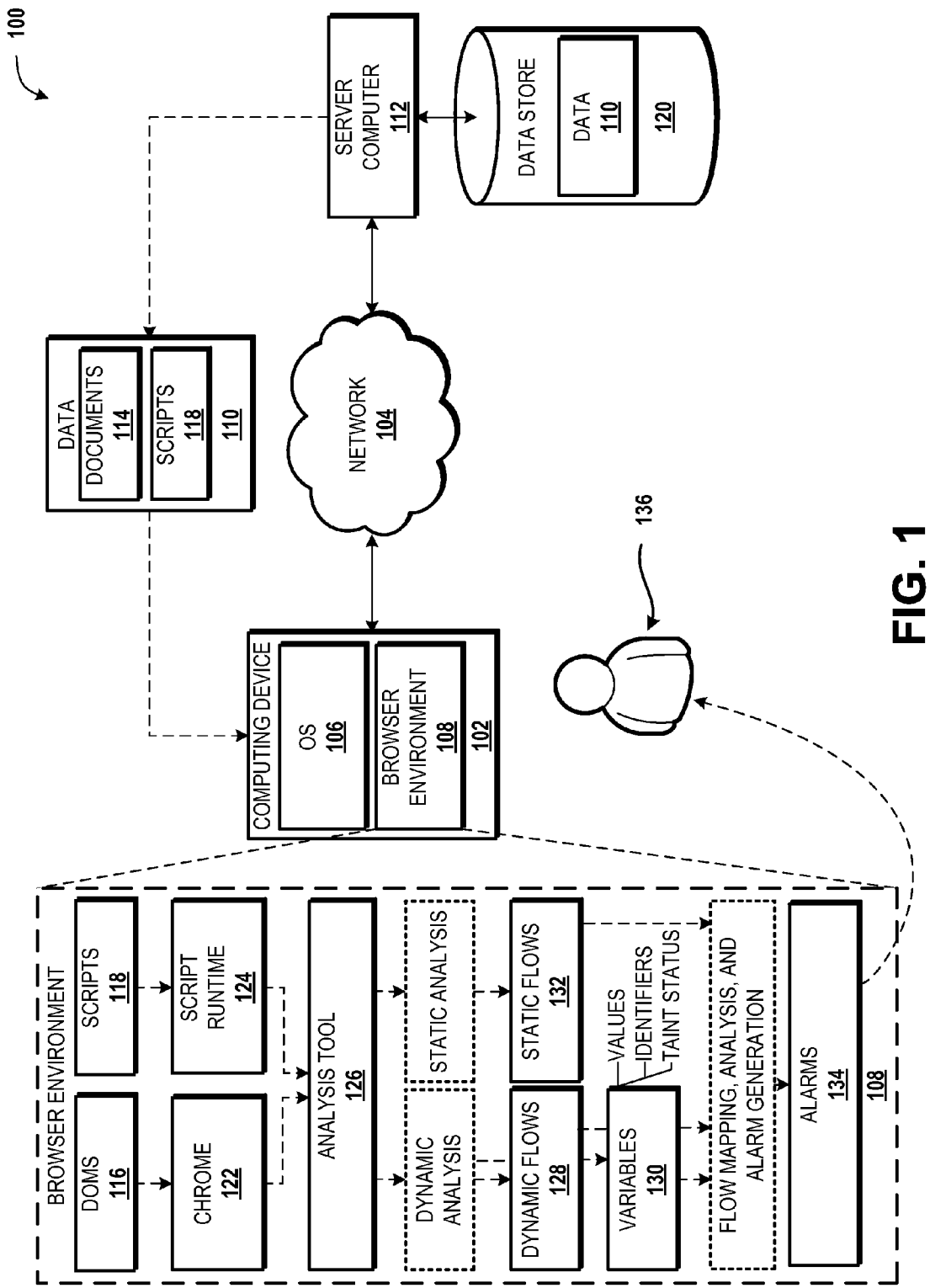
FIG. 1 is a system diagram showing aspects of an operating environment for various implementations of the concepts and technologies disclosed herein for an analysis tool for data security, according to one illustrative embodiment.

The following detailed description is directed to an analysis tool for data security. According to various implementations, a computing device is configured to execute or host a browser environment. The browser environment can include a browser chrome; a script runtime or other virtual machine for executing client-side scripts or other executable code; and a plugin, add-on, extension, or other functionality for providing an analysis tool for analyzing code to determine data security. According to various embodiments of the concepts and technologies disclosed herein, data can be provided to the computing device by a server computer or other device or entity. The data can include one or more instances of content such as documents from which document object models can be generated and executable code such as scripts.

The computing device can be configured to execute the data in the browser environment to analyze security of the data. According to various embodiments, the analysis tool can be configured to analyze the data using a dynamic analysis and a static analysis of the data. During the dynamic analysis of the data, the analysis tool can be configured to execute various test execution flows or paths ("test cases") through the code to evaluate how the code behaves and/or reacts to the test cases. The analysis tool can be configured to monitor execution during the dynamic analysis or to receive monitoring information from other entities.

The analysis tool can obtain information that indicates how the data is interacted with and/or execution paths experienced or observed during execution of the test cases. Data indicating these execution paths can be output as dynamic program execution flows ("dynamic flows"). The analysis tool also can obtain information indicating variable inputs, variable values, variable identifiers and/or a taint status associated with variables at various stages of execution along the execution paths corresponding to the dynamic flows. As used herein, a "variable" can refer to a parameter or other type of program variable referenced by a script or program, as well as other information. For example, a "variable" as used herein can refer to a portion of a document object model, a storage location on a disk or other data storage device, or other references included in the data. This information can be output by the analysis tool as a trace log or other log of variable data that can be analyzed by the analysis tool to track propagation of the variables through the execution environment.

With regard to taint status, the variables can include a field or flag that can be used to indicate that the variable is tainted or untainted, among other indications, and the analysis tool can enforce various rules or policies to manage how a variable becomes tainted or untainted. In some implementations, the analysis tool enforces rules that pessimistically view inputs as "tainted" until a whitelisted or other safe operation is executed on the variable, thereby rendering the variable "untainted." By way of enforcing this pessimistic approach, the analysis tool can track variables through the dynamic flows and/or the execution environment and determine if outputs of specific flows are safe or unsafe based upon the taint status.

The analysis tool also can be configured to execute a static analysis for analyzing the data. During the static analysis, the analysis tool can identify possible execution paths for the data. Because the possible execution paths may include a large number of possible paths, the analysis of which may require resource-consuming and/or time-consuming analyses, the analysis tool can be configured to collapse and/or sample some functionality of the data to build a representation of the data, and output various static program execution flows ("static flows") that correspond to the sampled and/or collapsed functionality.

The analysis tool can be configured to map one or more portions of the dynamic flows output during the dynamic analysis to one or more of the static flows output during the static analysis. During the mapping, the analysis tool can identify dynamic flows that are similar or identical to the static flows, or portions thereof, and thereby model the static flows with actual observed program execution flows tracked during the dynamic analysis. After mapping the dynamic flows to the static flows, the analysis tool can analyze the dynamic flows and the associated variable taint status information to determine if a final output associated with the dynamic flow includes a taint status of "tainted" or "untainted." It should be understood that more than one of the mapped dynamic flows may reference the same variable and/or multiple variables that are similar or related to one another. As such, the "final output" can be used herein to refer to the last time the variable (or a variable similar to that variable) is referenced by any of the mapped dynamic flows in addition to, for instead of, the final output of a single dynamic flow. According to embodiments, final output having a taint status of "tainted" can be assumed to be unsafe, while final output having a taint status of "untainted" can be assumed to be safe. Unsafe static flows can be examined in additional detail by the analysis tool to determine if the portion of the data corresponding to the static flows includes vulnerabilities and/or to prompt corrective action for those vulnerabilities.

According to various embodiments of the concepts and technologies disclosed herein, the analysis tool can be configured to recognize various dynamic flow mapping scenarios and to address those scenarios during the analysis of the mapped dynamic flows. Additionally, the analysis tool can be configured to map the dynamic flows in accordance with various heuristics that may give preference to longer dynamic flows and/or to mapped dynamic flows that yield the fewest complications such as gaps and/or overlaps in dynamic flow execution. These and other aspects of the concepts and technologies disclosed herein will be illustrated and described in additional detail below.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances and the like. The embodiments described herein may be practiced in distributed execution environments, where tasks are performed by remote processing devices that are linked through a communications network. In a distributed execution environment, program modules may be located in both local and remote memory storage devices.

In the following detailed description, references are made to the accompanying drawings that form a part hereof, and that show, by way of illustration, specific embodiments or examples. The drawings herein are not necessarily drawn to scale. Like numerals represent like elements throughout the several figures.

FIG. 1 and the following description are intended to provide a brief, general description of a suitable computing environment in which the embodiments described herein may be implemented. In particular, FIG. 1 is a system and network diagram that shows aspects of an illustrative operating environment 100 that includes a computing device 102 operating as a part of and/or in communication with a communications network ("network") 104.

According to various implementations, the functionality of the computing device 102 can be provided by any number of computing resources operating as a part of and/or in communication with the network 104. As such, the functionality of the computing device 102 described herein can be provided as a service or component operating in a network-based or cloud computing environment provided by the network 104 or other networks or systems. As such, although the network 104 and the computing device 102 are illustrated and described herein as separate entities, the functionality associated with the computing device 102 and the network 104 may be provided by similar or identical real or virtual computing resources.

According to some other implementations, the functionality of the computing device 102 can be provided by one or more computing devices such as, for example, a personal computer ("PC"), a laptop computer, a notebook computer, a tablet computer, a portable computing device 102 such as a smartphone, or the like, and/or other types of computing devices. In some other implementations, the functionality of the computing device 102 can be provided by one or more server computers or other computing devices configured to execute an application program or module for providing the functionality described herein for an analysis tool for data security. In the embodiment illustrated in FIG. 1, the functionality of the computing device 102 can be provided by personal computer configured to execute an operating system 106 and a browser environment 108. It should be understood that this embodiment is illustrative, and should not be construed as being limiting in any way.

Because the functionality of the computing device 102 can be provided by various combinations of hardware, software and/or other real or virtual resources, it should be understood that the functionality described herein with regard to the computing device 102 and/or the browser environment 108 can be provided by one or more hardware and/or software components. It should be understood that the functionality described herein with reference to the computing device 102 and the browser environment 108 can be provided by one or more systems or devices operated and/or owned by various entities.

The computing device 102 can be configured to obtain data 110 from one or more sources such as, for example, a server computer 112 that can be configured to host and/or serve the data 110 to various requestors such as the computing device 102. The data 110 can include data associated with a web site and/or various web-based applications. Thus, the data 110 can include, but is not limited to, one or more documents 114, which the computing device 102 can use to generate document object models ("DOMs") 116; various scripts, snippets and/or other instances of executable code ("scripts") 118; other data (not illustrated); combinations thereof; or the like. The data 110 can be hosted and/or stored at the server computer 112 and/or accessed by the server computer 112. Thus, as shown in FIG. 1, the data 110 also can be stored at and/or hosted by a data store 120. According to various implementations, the functionality of the data store 120 can be provided by one or more memory devices, servers, databases, mass storage devices and/or other stand-alone, networked and/or cloud-based data storage devices.

According to various embodiments of the concepts and technologies disclosed herein, the data 110 can correspond to a web site, a web application and/or other forms of content. A developer, hosting company, network operator and/or other entity may determine that the data 110 is to be tested for vulnerabilities. In particular, because the data 110 can include scripts 118 that are to be executed by a client-side device or other computer such as the illustrated computing device 102, an entity may test the data 110 for vulnerabilities. According to various implementations of the concepts and technologies disclosed herein, the computing device 102 can be configured to test the data 110 to identify vulnerabilities and/or to notify an entity about the vulnerabilities.

As shown in FIG. 1, the computing device 102 can execute or host the browser environment 108. In some embodiments, the functionality of the browser environment 108 can be provided by a browser application. In some other embodiments, the functionality of the browser environment 108 can be provided by a browser application and one or more plugins, add-ons, extensions, or other functionality as will be explained in more detail herein. According to some implementations, the browser application can be provided by one or more members of the INTERNET EXPLORER family of browser applications from Microsoft Corporation in Redmond, Wash., the MOZILLA FIREFOX family of browser applications from Mozilla Corporation in Mountain View, Calif., the CHROME family of browser applications from Google Inc. in Mountain View, Calif. and/or other browser applications. It should be understood that these embodiments are illustrative, and should not be construed as being limiting in any way.

The browser environment 108 can include a browser chrome ("chrome") 122, which can include menus, window frames, various UI controls for supporting web navigation and/or interactions with other web content, scroll bars, toolbars, or the like. The chrome 122 also can include borders of a browser window in which web content is to be displayed. Because various aspects of the chrome 122 are generally understood, the chrome is not explained in additional detail herein.

The browser environment 108 also can include a script runtime environment ("script runtime") 124. The script runtime 124 can support execution of the scripts 118 and interaction between various software and/or hardware of the computing device 102 with the browser environment 108. According to some embodiments, the functionality of the script runtime 124 may be provided by a virtual machine that can execute the scripts 118. The script runtime 124 also can include various data structures that allow translation of data from data in the script runtime 124 to allow storage of data at the computing device 102 outside of the virtual machine environment of the script runtime 124. As will be explained in more detail below, the script runtime 124 also may be configured to track execution of the scripts 118, variable propagation and/or modification during execution of the scripts 118, variable output and/or to track other aspects of execution and/or display of the data 110 within the browser environment 108.

The browser environment 108 also can include an add-on, a plugin, an extension and/or other functionality for providing an analysis tool 126. The analysis tool 126 can be configured to analyze interactions with the data 110 within the browser environment 108 to support analysis of the data 110 for vulnerabilities. In some embodiments, the analysis tool 126 can be included as a part of the browser application that provides the browser environment 108 and in some other embodiments, the analysis tool 126 can be provided by an extension or other code. In the following description, the analysis tool 126 is described as executable code that operates in conjunction with and/or as a part of the browser environment 108. Because the functionality of the analysis tool 126 can be provided by other executable code, it should be understood that this embodiment is illustrative, and should not be construed as being limiting in any way.

As shown in FIG. 1, the analysis tool 126 can be configured to monitor execution of the scripts 118 within the script runtime 124 and/or to monitor display and/or execution of the document object models 116 within the browser environment 108. As explained above, the script runtime 124 can be configured to track variables and/or execution paths associated with the scripts 118, and the analysis tool 126 therefore can be configured to monitor and/or obtain output from the script runtime 124 as part of the execution monitoring. According to various implementations of the concepts and technologies disclosed herein, the analysis tool 126 can be configured to execute a dynamic analysis of the data 110 and/or to execute a static analysis of the data 110, and to use output from these analyses to identify and/or correct vulnerabilities.

In particular, the analysis tool 126 can be configured to complete a dynamic analysis of the data 110. During the dynamic analysis of the data 110, the analysis tool 126 can execute the data 110 in accordance with one or more test cases. The test cases can correspond to execution paths or flows through the data 110. Thus, for example, if a web application includes three controls that may be selected by a user or other entity, the analysis tool 126 can be configured to execute three test cases that correspond, respectively, to selection of the first, second and third controls. It should be understood that this embodiment is illustrative, and should not be construed as being limiting in any way.

According to various embodiments of the analysis tool 126, the test cases can be determined and/or selected to test a number of execution paths and/or execution scenarios with respect to the data 110. The analysis tool 126 can interface with the chrome 122 and/or the script runtime 124 to monitor execution of the data 110 within the browser environment 108 and/or to track various information during the execution of the data 110. With respect to the scripts 118, the analysis tool 126 can be configured to communicate with the script runtime 124 to obtain variable tracking information tracked during execution of the data 110 and/or to identify one or more dynamic execution paths or flows ("dynamic flows") 128. The dynamic flows 128 can correspond to an execution path taken through the data 110 by way of applying a test case to the data 110. Thus, in the above example of selecting a first of three controls, one of the dynamic flows 128 can correspond to an execution path resulting from selection of the first control. It should be understood that this embodiment is illustrative, and should not be construed as being limiting in any way.

As noted above, the analysis tool 126 also can generate and/or output variable tracking information. As shown in FIG. 1, output from the analysis tool 126 during the dynamic analysis can include variables 130. The variables 130 can include variable values, identifiers for the variables, a taint annotation or taint status ("taint status") and/or other information (not shown). The variable values included in the variables 130 can correspond to a value of the variables 130 at a particular and/or at multiple times during execution of the data 110. Similarly, the identifiers can include various identifiers such as globally unique identifiers ("GUIDs") and/or other identifiers that can be used to identify the variables 130 at particular and/or at multiple times during execution of the data 110. Thus, as a variable 130 is propagated through the browser environment 108 during execution of the data 110, the value and/or identity of the variable 130 can be tracked by the analysis tool 126 and output as the variables 130 during the dynamic analysis.

The taint status of the variables 130 can be used to track vulnerabilities included in the data 110 as the data 110 is executed and/or as the variables 130 are propagated through the execution environment. According to various implementations, the taint status can correspond to a flag or field included in the variables 130. The taint status can include a Boolean indicator such as yes/no; 0/1; true/false; present/absent; tainted/untainted; or the like. To simplify the description herein, the taint status is described as including a Boolean value of "tainted" or "untainted." It should be understood that this embodiment is illustrative, and should not be construed as being limiting in any way. The taint status of a variable 130 can indicate if the variable 130 has been subjected to an operation that is assumed to sanitize tainted variables 130 and/or if not. Thus, the taint status of the variables 130 can be tracked by the analysis tool 126 and used to track how potentially tainted variables 130 may propagate through the execution environment and/or be interacted with by other operations within the execution environment.

According to various embodiments, the computing device 102 can be configured, via execution of the browser environment 108, to enforce a pessimistic approach to considering taint status of a variable 130. In particular, the taint status of variables 130 can be assumed to be tainted when the variables 130 are instantiated and/or initialized within the browser environment 108. During execution of the data 110, the analysis tool 126 can be configured to change the taint status to "untainted" if an operation that is known to validate the variable 130 is taken or detected. Thus, the analysis tool 126 can be configured to track and/or impose a whitelist of operations or functions that, if taken with respect to the variables 130, may change the taint status to "untainted."

A pessimistic approach to considering taint status can also be imposed on operations that reference or include variables 130 having a taint status of "tainted." For example, if an operation includes combining two variables 130, one having a taint status of "tainted" and the other having a taint status of "untainted," the analysis tool 126 can be configured to propagate the taint status of "tainted" instead of the "untainted" status. Thus, a variable 130 having a taint status of "tainted" can be tracked through a number of operations until a whitelisted operation or function is taken with respect to the variable 130 to render the variable 130 untainted. As such, the variables 130 output by the analysis tool 126 during the dynamic analysis also can include the taint status, which can enable the analysis tool 126 to track propagation of potentially unsafe variables 130 though the execution environment.

The analysis tool 126 also can be configured to perform a static program analysis ("static analysis") of the data 110. During the static analysis of the data 110, the analysis tool 126 can be configured to determine, enumerate, or retrieve all possible execution paths or flows ("execution paths") through the data 110. Thus, the execution paths can represent all possible interactions with the data 110. Because the data 110 can include hundreds, thousands, or even millions of lines of code, it can be appreciated that the number of execution paths representing all possible interactions with the data 110 can be a massive number that may make meaningful analysis of each execution path unreasonably expensive in terms of computing power and/or time.

Thus, the analysis tool 126 can be configured to collapse some execution paths and/or to sample execution paths during the static analysis. For example, if a particular block of code included in the data 110 may be executed five times but will result in the same output each time, the analysis tool can be configured to collapse these five executions of the block of code into a single execution. It should be understood that this embodiment is illustrative, and should not be construed as being limiting in any way. Once the collapsed and/or sampled execution paths are identified by the analysis tool 126, the analysis tool 126 can identify these execution paths as static flows 132 and may output these static flows 132 during the static analysis. It can be appreciated that as used herein, "outputting" the dynamic flows 128 and the static flows 132 can refer to outputting data representing these flows.

The analysis tool 126 also can be configured to perform analysis of the results of the static analysis and the dynamic analysis. In particular, the analysis tool 126 can be configured to map the dynamic flows 128, which can represent actual execution paths through the data 110, to the static flows 132, which can represent possible execution paths through the data 110. As such, the analysis tool 126 can be configured to map actual execution results and/or variable propagation information to possible execution scenarios to test the data 110 without executing all possible execution paths against the data 110.

As will be explained in more detail below, particularly with respect to FIGS. 6-7, the analysis tool 126 can map the dynamic flows 128 to the static flows 132. During mapping, the analysis tool 126 can search dynamic flows 128 that match static flows 132 in their entirety, and/or identify dynamic flows 128 and/or portions thereof that match portions of the static flows 132. According to some embodiments, a single mapped dynamic flow 128 may be an exact match for a particular static flow 132. According to some other embodiments, however, one or more dynamic flows 128 may be used in combination to represent the static flows 132. In mapping the dynamic flows 128 to the static flow 132, an overlap condition may exist among the dynamic flows 128, a gap condition may exist between the dynamic flows 128, and/or a weld condition may exist between the dynamic flows 128.

The overlap condition can correspond to a situation in which portions of two dynamic flows 128 both overlap a portion of the static flow 132. In particular, execution of a mapped second dynamic flow 128 may begin during execution of a mapped first dynamic flow 128. The analysis tool 126 can be configured to address an overlap condition by taking one of several actions. The analysis tool 126 may use a "rollback" approach, wherein the analysis tool undoes evaluations to move backward through the dynamic flow 128. The analysis tool 126 may rollback through execution of the dynamic flow 128 by using a trace log or other functionality for tracking or recording each executed step included in the dynamic flow 128. Once the dynamic flow 128 is rolled back to the point at which execution of the second dynamic flow 128 begins, the analysis tool 126 can begin execution of the second dynamic flow 128.

The analysis tool also can modify the virtual machine (e.g., the script runtime 124) to record each operation performed during the dynamic analysis. Thus, the analysis tool 126 can address an overlap by undoing or un-replaying a particular number of operations of the dynamic flow 128 that are overlapped by another dynamic flow 128. In another embodiment, the analysis tool 126 can be configured to "roll forward" or advance recorded execution operations associated with the second dynamic flow 128, though in some embodiments the analysis tool 126 may recognize that such an approach may be difficult due to the nature of the dynamic flow 128 as a continuing execution. Thus, the analysis tool 126 can be configured to recognize that truncating the dynamic flow 128 from a beginning to some point within the dynamic flow 128 may result in an inaccurate representation of the execution path and therefore may use the "roll forward" approach as a fallback position if the rollback and/or un-replay approaches mentioned above are insufficient to address the overlap.

The gap condition can correspond to a situation in one or more portions of one or more dynamic flows 128 correspond to one or more portions of the static flow 132, but a dynamic flow 128 corresponding to at least one portion of the static flow 132 is not available. The analysis tool 126 can be configured to ignore a gap if the gap is considered to be small. In some embodiments, the analysis tool 126 can consider a gap to be small if the gap corresponds to a particular number of operations or lines of code such as five or fewer operations, five or fewer lines of code, one hundred or fewer operations, one hundred or fewer lines of code, or the like. Even if the gap is considered small by the analysis tool 126, the analysis tool 126 can be configured to determine that the gap is not to be ignored if the gap touches "significant code" such as the browser document object model, or the like.

The analysis tool 126 also can be configured to flag the gap as being potentially unsafe. Thus, the analysis tool 126 can be configured to notify a user or other entity that a gap exists and/or that additional analysis is to be (or should be) performed on the gap to determine if the gap is safe or unsafe. The user or other entity can perform some fuzzing on the test cases, e.g., make random mutations to the inputs and determine if this affects the output, etc. The analysis tool 126 also can be configured to simulate instructions occurring at the gap. According to various embodiments, the analysis tool 126 can be configured to ignore a gap by default based upon an assumption that the gap corresponds to insignificant code. It should be understood that these embodiments are illustrative, and should not be construed as being limiting in any way.

A weld condition can correspond to a situation in which two or more dynamic flows 128 and/or portions thereof match a static flow 132 without gaps and/or overlaps. Thus, a weld condition and/or an exact match condition can both correspond to situations in which dynamic flows 128 and/or portions thereof exist for an entire static flow 132. It should be understood that this embodiment is illustrative, and should not be construed as being limiting in any way.

In some embodiments, the analysis tool 126 can be configured to generate one or more alarms 134 during the analysis of the results. The alarms 134 can indicate vulnerabilities and/or potentially unsafe portions of the data 110. The alarms 134 can be provided to various reporting mechanisms and/or may be output to a user or other entity ("user") 136. Thus, the alarms 134 can be output to trigger various corrective actions such as additional analysis or fuzzing, developer intervention, patches or updates, or the like. It should be understood that these embodiments are illustrative, and should not be construed as being limiting in any way.

During analysis of the results, the analysis tool 126 also can be configured to apply various heuristics to the flow mapping described herein. In particular, the analysis tool 126 can be configured to apply a rule that the longest possible dynamic flows 128 are to be mapped to the static flows 132, as a particular dynamic flow 128 may be more reliable than another dynamic flow 128 that is shorter than the particular dynamic flow 128. It should be understood that this embodiment is illustrative, and should not be construed as being limiting in any way.

Another heuristic can include applying a penalty to gaps identified during the mapping. Thus, various mapping scenarios can be analyzed and penalties may be applied to the scenarios based upon gaps. The mapping scenarios also can be analyzed to determine flow lengths of the dynamic flows 128 included in that mapping scenario. The multiple mapping scenarios can be considered and the mapping scenario having the lowest penalty, e.g., the mapping scenario having the fewest gaps and/or the mapping scenario having the longest average flow lengths can be selected. It should be understood that this embodiment is illustrative, and should not be construed as being limiting in any way.

Once dynamic flows 128 have been mapped to the static flows, the dynamic flows 128 and/or variables 130 associated with the mapped dynamic flows 128 can be analyzed to determine if a variable 130 having a taint status of "tainted" is included in the final output of the dynamic flow 128. For dynamic flows 128 having a final output that includes a taint status of "tainted," the analysis tool 126 can be configured to perform an analysis to identify false negatives and/or false positives. The analysis tool 126 can solve these false negatives and/or false positives and/or flag these positives for additional analysis by the user 136. Thus, the analysis tool 126 can be configured to trigger an alarm 134 for each of the dynamic flows 128 having a final output with a "tainted" taint status, if desired. As noted above, the analysis tool 126 also can be configured to trigger an alarm 134 for variables that have the taint status "tainted" when last referenced in the mapped dynamic flows 128 and/or static flows 132 associated with the mapped dynamic flows 128. The analysis tool 126 also can be configured to exercise the static flows 132 corresponding to these dynamic flows 128 to attempt to determine if the static flows 132 are safe or unsafe. Additional details of the analysis of the data 110 to identify vulnerabilities are described in more detail below.

FIG. 1 illustrates one computing device 102, one network 104, one server computer 112, and one data store 120. It should be understood, however, that some implementations of the operating environment 100 can include zero, one, or more than one computing device 102, zero, one, or more than one network 104, zero, one, or more than one server computer 112, and zero, one, or more than one data store 120. As such, the illustrated embodiment of the operating environment 100 should be understood as being illustrative, and should not be construed as being limiting in any way.

Figure 2A:
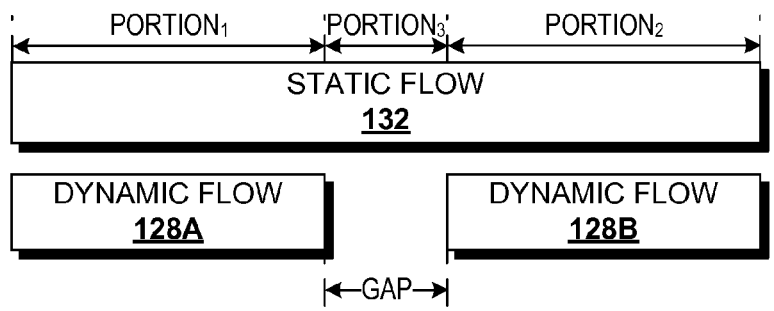
FIGS. 2A-2D are block diagrams schematically illustrating mapping dynamic execution flows to static execution flows, according to some example embodiments.

Turning now to FIGS. 2A-2D, additional aspects of the concepts and technologies disclosed herein for an analysis tool for data security are described. In particular, FIGS. 2A-2D are block diagrams schematically illustrating mapping dynamic execution flows to static execution flows, according to some example embodiments. Turning to FIG. 2A, an example of a gap is illustrated. As shown, two dynamic flows 128A-B may be mapped to a static flow 132. Thus, the dynamic flow 128A may correspond to, and may be mapped to, a first portion $PORTION_1$ of the static flow 132. Similarly, the dynamic flow 128B may correspond to, and may be mapped to, a second portion $PORTION_2$ of the static flow 132. Thus, a dynamic flow 128 corresponding to a third portion $PORTION_3$ of the static flow 132 may not be available. Thus, the third portion $PORTION_3$ can correspond to a gap as described herein. As will be explained in more detail herein, the computing device 102 can be configured to apply one or more rules to address the gap during analysis of the mapped dynamic flows 128.

In particular, a first rule for addressing the gap can include ignoring the gap. In particular, the computing device 102 can be configured to determine, by default or otherwise, that a gap corresponds to unimportant code and/or that ignoring the execution corresponding to the gap will likely not affect the outcome of the program or other type of data 110. In some embodiments, the computing device 102 can be configured to ignore the gap if the gap is relatively small (as explained above with reference to FIG. 1) and if the gap does not touch or include important code such as the browser document object model, or the like.

Another rule for addressing the gap can include flagging the corresponding static flow 132 and/or a portion thereof as being potentially unsafe. Thus, the computing device 102 can be configured to output an alarm 134 or other notification that the static flow 132 is to be subjected to additional analysis and/or testing in response to detecting the gap. It should be understood that this embodiment is illustrative, and should not be construed as being limiting in any way. Because the gap can be addressed in additional and/or alternative ways, it should be understood that these embodiments are illustrative, and should not be construed as being limiting in any way.

Figure 2B:
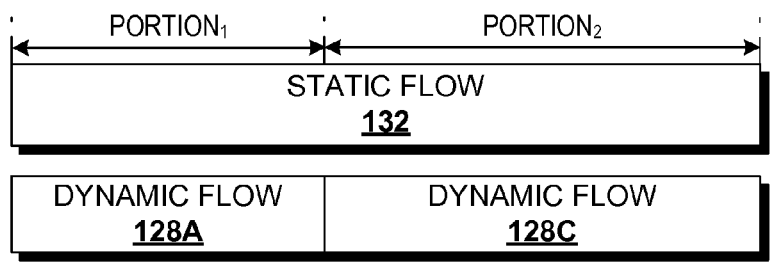

Turning to FIG. 2B, an example of a weld is illustrated. As shown, two dynamic flows 128A, 128C may be mapped to a static flow 132. Thus, the dynamic flow 128A may correspond to, and may be mapped to, a first portion $PORTION_1$ of the static flow 132, and the dynamic flow 128C may correspond to, and may be mapped to, a second portion $PORTION_2$ of the static flow 132. As shown in FIG. 2B, the two dynamic flows 128A, 128C can correspond to and be mapped to the entirety of the static flow 132 and as such, no gap may exist. Thus, the computing device 102 can be configured to join the dynamic flows 128A, 128C together as representing the static flow 132. It should be understood that this embodiment is illustrative, and should not be construed as being limiting in any way.

Figure 2C:
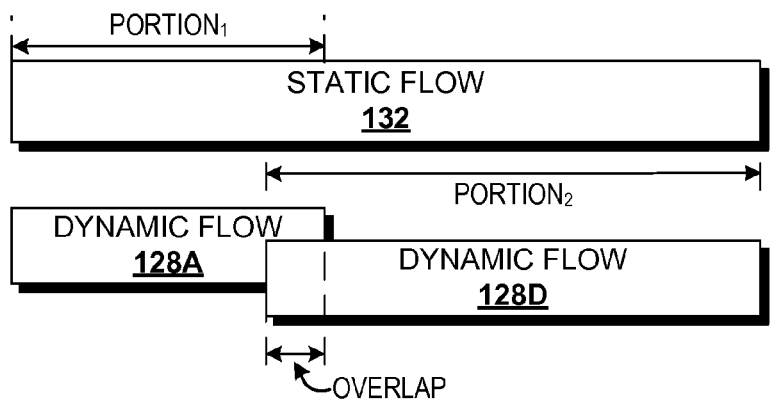

Turning to FIG. 2C, an example of an overlap is illustrated. As shown, two dynamic flows 128A, 128D may be mapped to a static flow 132. As explained above, the dynamic flow 128A may correspond to, and may be mapped to, a first portion $PORTION_1$ of the static flow 132. Similarly, the dynamic flow 128D may be mapped to a second portion $PORTION_2$ of the static flow 132. As shown in FIG. 2C, portions of the dynamic flows 128 may both overlap a portion of the static flow 132 as indicated in FIG. 2C as the "OVERLAP." As will be explained in more detail herein, the computing device 102 can be configured to apply one or more rules or approaches to the overlap during analysis of the mapped dynamic flows 128.

In particular, a first rule for addressing the overlap can include rolling back recorded operations of a first dynamic flow 128 that is or are overlapped by operations of a second dynamic flow 128. This approach can be based on an assumption that truncating operations of a dynamic flow 128 at the end of the dynamic flow 128 may not affect the operations at the beginning of that dynamic flow 128 and therefore may not affect the modeling accomplished by mapping the dynamic flow 128 to the static flow 132. Thus, the computing device 102 can be configured to roll back operations of the first dynamic flow 128A until a point at which the operations of the second dynamic flow 128D begin to overlap the first dynamic flow 128A, and then map operations the second dynamic flow 128D to the static flow 132. It should be understood that this embodiment is illustrative, and should not be construed as being limiting in any way.

In some embodiments, the virtual machine used to generate the dynamic flows 128 can be configured to record each operation performed during the dynamic analysis. Thus, another rule for addressing the overlap can include undoing operations in the first dynamic flow 128A, which may be similar to the rollback approach explained above. Another rule for addressing the overlap can include rolling forward execution of the second dynamic flow 128D, e.g., truncating execution of the second dynamic flow 128D to a point at which execution of the first dynamic flow 128A ends. As mentioned above, because the roll forward approach involves mapping a portion of a dynamic flow 128 recorded in the midst of execution, the computing device 102 can be configured to use the roll forward approach as a fallback position. Because the overlap can be addressed in additional and/or alternative ways, it should be understood that these embodiments are illustrative, and should not be construed as being limiting in any way.

Figure 2D:
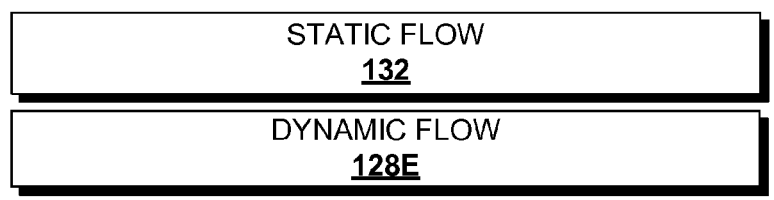

Turning to FIG. 2D, an example of an exact match is illustrated. As shown, a single dynamic flow 128E may correspond to, and may be mapped to, the entire static flow 132. Thus, the dynamic flow 128E can be an exact match for the static flow 132. Thus, the computing device 102, in analyzing the dynamic flow 128E as described herein, may not need to weld dynamic flows 128, and also may determine that no gap and/or overlap exists among the dynamic flows 128. These and other aspects of analyzing dynamic flows are illustrated and described herein, particularly with reference to FIGS. 6-7.

Figure 3:
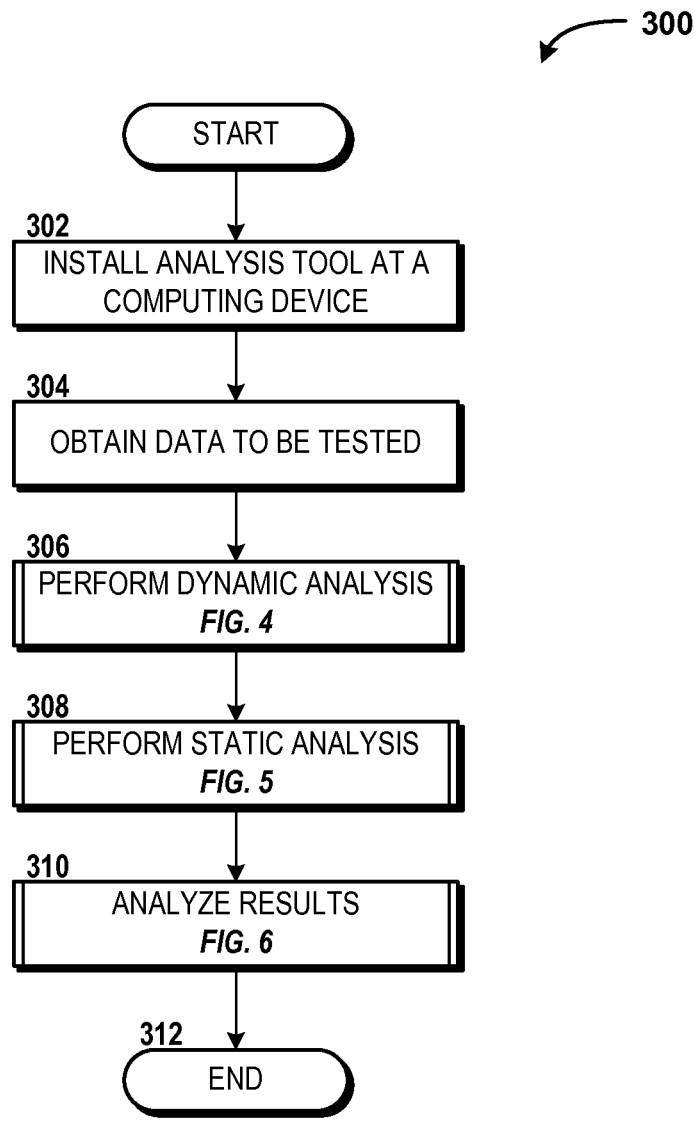
FIG. 3 is a flow diagram showing aspects of one method disclosed herein for analyzing data using an analysis tool, according to an embodiment.

Turning now to FIG. 3, aspects of a method 300 for analyzing data using an analysis tool will be described in detail. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted and/or performed simultaneously, without departing from the scope of the appended claims.

It also should be understood that the illustrated methods can be ended at any time and need not be performed in their respective entireties. Some or all operations of the methods disclosed herein, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic and any combination thereof.

For purposes of illustrating and describing the concepts of the present disclosure, the method 300 is described as being performed by the computing device 102 via execution of an analysis tool 126. It should be understood that this embodiment is illustrative, and should not be viewed as being limiting in any way. According to various contemplated implementations of the concepts and technologies disclosed herein, devices other than the computing device 102 can provide the functionality described herein via execution of one or more applications or modules instead of, or in addition to, the analysis tool 126.

The method 300 begins at operation 302, where the computing device 102 installs the analysis tool 126 at the computing device 102. According to various implementations of the concepts and technologies disclosed herein, the analysis tool 126 can be part of a browser environment 108, as explained above. Thus, the analysis tool 126 can correspond, in some implementations, to an extension, an add-on, a plugin and/or another type of functionality that can interact with a browser application to provide the functionality described herein. In some other implementations, the analysis tool 126 can be included as part of a browser application and as such, installing the analysis tool 126 can correspond to installing a browser application, installing an update for the browser application, combinations thereof, or the like. Because the analysis tool 126 can be installed in a number of additional and/or alternative ways, it should be understood that these embodiments are illustrative, and should not be construed as being limiting in any way.

From operation 302, the method 300 proceeds to operation 304, where the computing device 102 obtains data to be tested. According to various embodiments of the concepts and technologies disclosed herein, the computing device 102 can obtain the data 110 and/or an instance thereof in operation 304. As illustrated in FIG. 1 and explained above, the data 110 obtained in operation 304 can include, but is not limited to, one or more documents 114, from which the computing device 102 can generate document object models 116, and one or more scripts 118 or other executable code. In one contemplated embodiment, the data 110 can correspond to an application or program that is to be analyzed by the analysis tool 126 and therefore can correspond to a web page and a client-side script such as a web application and/or a portion thereof. Because other types of data can be obtained in operation 304, it should be understood that this embodiment is illustrative, and should not be construed as being limiting in any way.

From operation 304, the method 300 proceeds to operations 306, where the computing device 102 performs dynamic analysis of the data obtained in operation 304. Additional details of the functionality of the computing device 102 for performing the dynamic analysis of the data are illustrated and described in additional detail below with reference to FIG. 4. Briefly, the computing device 102 can execute the data through a number of test cases that explore various execution paths of the data and/or a program corresponding to the tested data.

During the execution, the computing device 102 can capture various data relating to how data and/or variables are propagated through the application. For example, state changes, variable values, variable inputs, variable taint status and/or other aspects of the execution can be captured by and/or logged by the computing device 102. These and other data can be saved to a log. In some embodiments, as shown in FIG. 1 and explained in additional detail with reference to FIG. 4 below, the computing device 102 also can output dynamic flows 128 and/or other data that reflects one or more execution paths during the dynamic analysis described herein. The computing device 102 also can output variables 130 and/or a variable or variable value tracking log that can include data indicating variables, variable values, variable taint status, or the like, as explained herein in more detail.

From operation 306, the method 300 proceeds to operation 308, where the computing device 102 performs static analysis of the data obtained in operation 304. Additional details of the functionality of the computing device 102 for performing the static analysis of the data are illustrated and described in additional detail below with reference to FIG. 5. Briefly, the computing device 102 can enumerate possible program flows or execution paths. Because the data may correspond to thousands, hundreds of thousands, or even millions of lines of code, the computing device 102 can be configured to make various assumptions during the static analysis of the data.

In particular, the computing device 102 can be configured to sample execution paths. Furthermore, the computing device 102 can be configured to collapse some execution paths or portions thereof instead of enumerating the execution paths in their entireties. Additionally, the computing device 102 can be configured to make assumptions regarding execution of execution paths. For example, if the computing device 102 determines that a loop can be executed any number of times, the computing device 102 can be configured to consider execution of the loop zero times, one time, two times and/or three times and to assume that these numbers of executions of the loop can accurately represent execution of the execution paths. Because the computing device 102 can sample, collapse and/or make assumptions with regard to portions of the analyzed program in additional and/or alternative ways, this example should be understood as being illustrative, and should not be construed as being limiting in any way. During the static analysis, the computing device 102 also can output static flows or other data describing the explored and/or enumerated execution paths.

From operation 308, the method 300 proceeds to operation 310, where the computing device 102 analyzes the results of the dynamic analysis performed in operation 306 and the results of the static analysis performed in operation 308. Additional details of the functionality of the computing device 102 for analyzing the results of the static analysis and the dynamic analysis of the data 110 are illustrated and described in additional detail below with reference to FIG. 6. Briefly, the computing device 102 can select a static flow 132, identify one or more dynamic flows 128 that correspond to and/or can be mapped to the static flow 132, and map the dynamic flows 128 to the static flow 132. The computing device 102 also can be configured to analyze the taint statuses of variables tracked during the dynamic analysis. The computing device 102 can be configured to apply various heuristics to the mapped dynamic flows 128 and the variables 130 and their respective taint status information in output from the dynamic flows 128. The computing device 102 can be configured to identify variables 130 having a taint status of "tainted" in a final output from the dynamic flow 128 and/or variables 130 that, when last referenced by any of the dynamic flows 132 mapped to the static flows 132, has a taint status of "tainted."

Variables 130 having a taint status of "tainted" in the final output from the dynamic flow 128 and/or the last time the variables 130 are referenced can be identified by the computing device 102 as corresponding to potential vulnerabilities. The computing device 102 can be configured to identify false positives and false negatives among the final output from the execution paths. For final output that do not represent false positives for a tainted status of "tainted," the computing device 102 can flag the corresponding static flows 132, and perform fuzzing on the execution paths corresponding to the static flows 132 using a more detailed analysis to determine if the vulnerability is genuine. If so, one or more alarms 134 can be generated and/or the computing device 102 can be configured to surface the static flows 132 to the user 136 for additional analysis and/or corrective action.

From operation 310, the method 300 proceeds to operation 312. The method 300 ends at operation 312.

Figure 4:
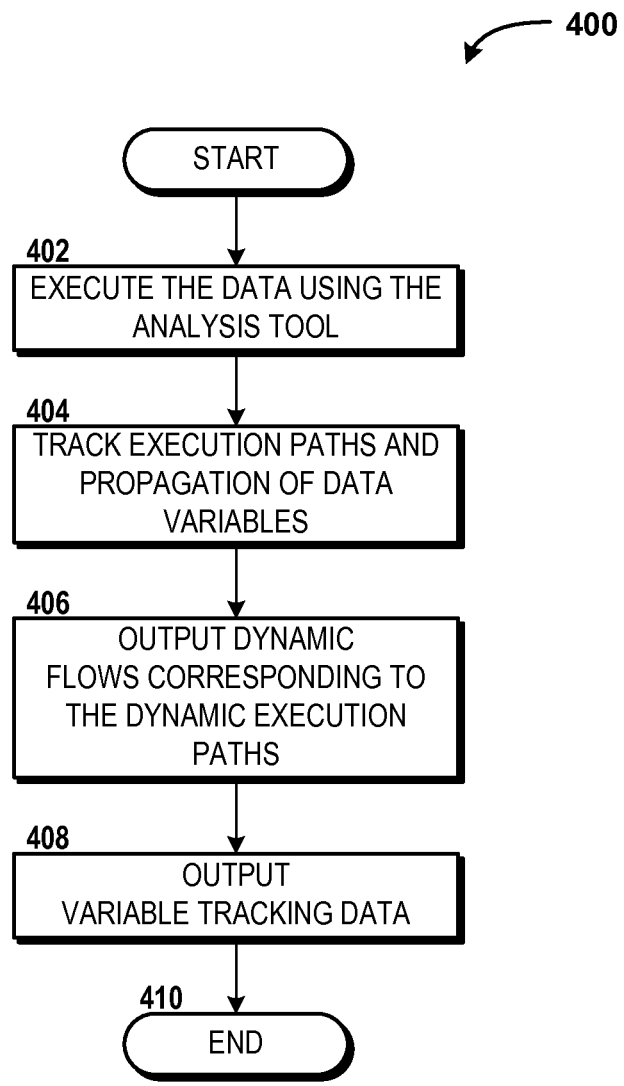
FIG. 4 is a flow diagram showing aspects of one method disclosed herein for performing dynamic analysis of data using an analysis tool, according to an embodiment.

Turning now to FIG. 4, aspects of a method 400 for performing dynamic analysis of data using an analysis tool are illustrated in detail. As mentioned above with reference to FIG. 3, the functionality described herein with reference to FIG. 4 can be, but is not necessarily, executed by the computing device 102 during execution of operation 306 of the method 300. The method 400 begins at operation 402, where the computing device 102 executes data 110 using the analysis tool 126. In particular, the computing device 102 can execute the data 110 obtained in operation 304 of the method 300 through execution of one or more test cases. In some implementations, the computing device 102 can be configured to execute as many test cases as possible, thereby exercising the program and/or other data 110 being analyzed via as many execution paths as possible. The test cases can be obtained from various sources and/or can be identified by the computing device 102.

From operation 402, the method 400 proceeds to operation 404, where the computing device 102 tracks execution paths and propagation of variables 130 during execution of the data 110. During execution of the data 110, the computing device 102 can track how the data 110 is executed and/or an execution path that describes and/or corresponds to the execution of the data 110. Furthermore, the computing device 102 can track propagation of the variables 130 through the program or other data 110 via tracking a taint status or other identifier or flag that can be included as part of the variables 130.

In some implementations, data structures associated with a virtual machine (e.g., the script runtime 124) can be extended to indicate where the variables 130 encountered during execution of the data 110 originate and/or to which the variables are output. This information can be tracked by the computing device 102, as explained above, and output with the variables 130 as values and/or taint status. Furthermore, the computing device 102 can be configured to output these variables 130 to a trace log with an identifier so that propagation of the variables 130 through the data 110 can be tracked and/or analyzed.

From operation 404, the method 400 proceeds to operation 406, where the computing device 102 outputs dynamic flows 128 corresponding to the execution paths tracked by the computing device 102 as explained above with reference to operation 404. The dynamic flows 128 output by the computing device 102 can correspond to and/or describe execution paths experienced during the dynamic analysis. The dynamic flows 128 therefore can describe real execution paths associated with the data 110 and can be used to test the program and/or other data 110 for vulnerabilities, as will be explained in more detail below, particularly with reference to FIGS. 6-7.

From operations 406, the method 400 proceeds to operation 408, where the computing device 102 outputs variable tracking data. As mentioned above, the computing device 102 can be configured to track variable values and/or other information during execution of the data 110. In some embodiments, the variable tracking data can include variable identifiers such as GUIDs, field values, flag values and/or indicators, a taint status field and/or associated values at various points in execution of the program or other data, any values calculated using the variable 130, outputs that include the variable 130 and the like. Thus, the tracked information output in operation 408 can include all values based upon a particular variable 130, as well as status identifiers and/or values such as the taint status described herein.

From operation 408, the method 400 can proceed to operation 410. The method 400 ends at operation 410.

Figure 5:
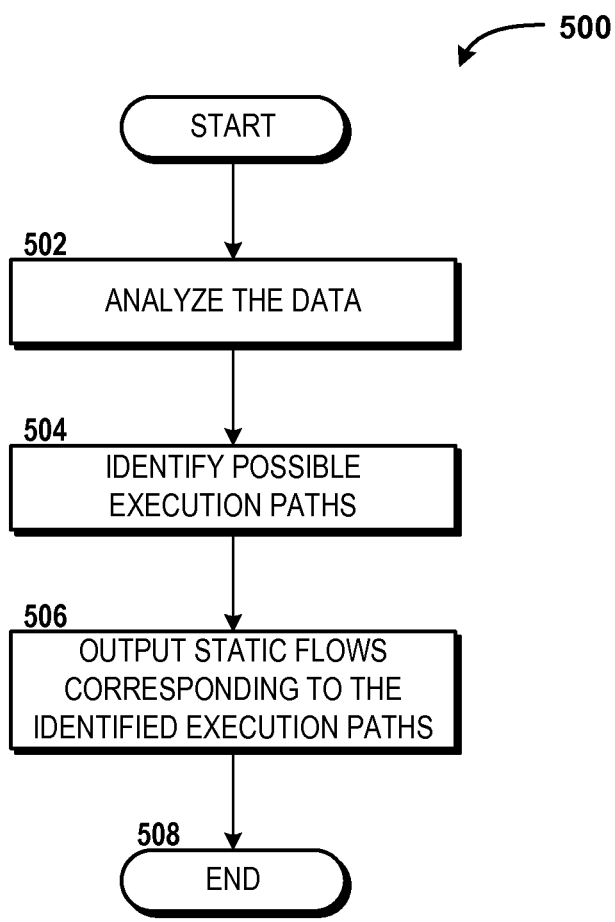
FIG. 5 is a flow diagram showing aspects of one method disclosed herein for performing static analysis of data using an analysis tool, according to an embodiment.

Turning now to FIG. 5, aspects of a method 500 for performing static analysis of data using an analysis tool are illustrated in detail. As mentioned above with reference to FIG. 3, the functionality described herein with reference to FIG. 5 can be, but is not necessarily, executed by the computing device 102 during execution of operation 308 of the method 300. The method 500 begins at operation 502, where the computing device 102 analyzes the data obtained in operation 304 of the method 300. As explained above, the data analysis illustrated in operation 502 can correspond to a static analysis of the data 110.

From operation 502, the method 500 proceeds to operation 504, where the computing device 102 identifies possible execution paths for the data 110 analyzed in operation 502. In operation 504, the computing device 102 can enumerate possible program flows and/or execution paths for the data 110 being analyzed by the computing device 102. The computing device 102 can be configured to make various assumptions during the static analysis of the data 110. For example, the computing device 102 can be configured to sample execution paths from the identified and/or enumerated execution paths for output during the static analysis. Furthermore, the computing device 102 can be configured to collapse some execution paths and/or portions thereof instead of enumerating the execution paths in their entireties. Additionally, the computing device 102 can be configured to make assumptions regarding execution of the execution paths.

Based upon these assumptions, collapsing and/or enumerations, the computing device 102 can identify static program execution flow paths (static flows) that describe how the program or other data 110 can be executed by the computing device 102. Thus, the static analysis can capture various scenarios in which the data 110 can be executed. Because the computing device 102 can sample, collapse and/or make assumptions with regard to portions of the analyzed data 110 in additional and/or alternative ways, this example should be understood as being illustrative, and should not be construed as being limiting in any way.

From operation 504, the method 500 proceeds to operation 506, where the computing device 102 outputs static flows corresponding to the execution paths identified in operation 504. In particular, the computing device 102 can output static flows 132 or other data describing the explored and/or enumerated execution paths, as sampled and/or collapsed as explained above. These static flows 132 can be output for use in identifying vulnerabilities in the data 110, as will be explained in additional detail below with reference to FIGS. 6-7.

From operations 506, the method 500 proceeds to operation 508. The method 500 ends at operation 508.

Figure 6:
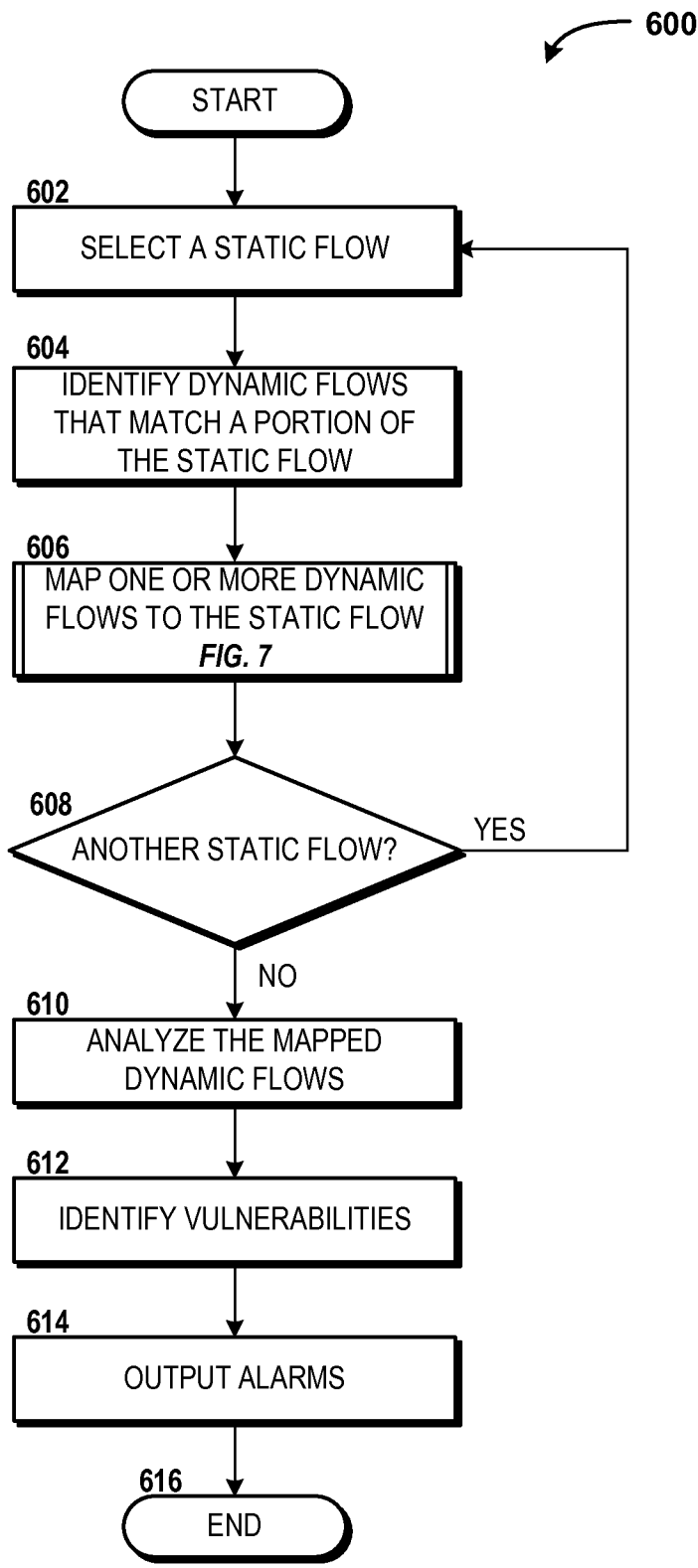
FIG. 6 is a flow diagram showing aspects of one method disclosed herein for analyzing results of dynamic analysis and static analysis of data using an analysis tool, according to an embodiment.

Turning now to FIG. 6, aspects of a method 600 for analyzing results of dynamic analysis and static analysis of data using an analysis tool are illustrated in detail. As mentioned above with reference to FIG. 3, the functionality described herein with reference to FIG. 6 can be, but is not necessarily, executed by the computing device 102 during execution of operation 310 of the method 300. The method 600 begins at operation 602, where the computing device 102 selects a static flow 132. According to various embodiments, the static flow 132 selected in operation 602 can be one of multiple static flows 132 such as the static flows 132 output by the computing device 102 in operation 506 of the method 500 described above with reference to FIG. 5. The computing device 102 may select a static flow 132 at random and/or may select the static flow 132 based upon some consideration such as, for example, the static flow 132 can be selected based upon code coverage (for example, the static flow 132 having the most covered paths may be chosen), security risk (for example, a risk score can be assigned to each of the static flows 132 and a static flow 132 having the highest risk may be selected first), an order of representation of the data 110, order in which the static flows 132 were generated, or the like.

From operation 602, the method 600 proceeds to operation 604, where the computing device 102 can identify one or more dynamic flows 128 that match one or more portions of the static flow 132 selected in operation 602. According to various embodiments, the computing device 102 can identify the dynamic flows 128 by recognizing that steps and/or logic included in the dynamic flows 128 are similar or even identical to the steps and/or logic included in the static flow 132 selected in operation 602. Thus, the computing device 102 can be configured to identify similarities between the dynamic flows 128 and/or the static flows 132 in operation 604.

As will be explained in more detail below, the computing device 102 can match entire dynamic flows 128 and/or portions of the dynamic flows 128 to the static flows 132. Thus, the dynamic flows 128 identified in operation 604 may match part of the static flows 132 and/or the entire static flows 132 alone or in combination with other dynamic flows 128. Furthermore, as will be explained in more detail below, the computing device 102 may not identify a dynamic flow 128 and/or a portion thereof for each portion of the static flow 132 and/or may identify multiple dynamic flows 128 and/or portions thereof that match a particular portion of a static flow 132. Thus, the computing device 102 may identify dynamic flows 128 that, when mapped to the static flows 132, result in exact matches, gaps, overlaps and/or welds, which are described in additional detail herein.

From operation 604, the method 600 proceeds to operation 606, where the computing device 102 maps one or more of the dynamic flows 128 identified in operation 604 to one or more portions of the static flow 132 selected in operation 602. In mapping the dynamic flows 128 to the static flow 132, the execution represented by the dynamic flows 128 can be mapped to corresponding execution of the static flow 132. As such, the computing device 102 can be configured to build a model of the static flows 132 by way of assembling one or more dynamic flows 128 and/or portions thereof that may approximate execution of the static flows 132. Thus, expected execution paths (the static flows 132) can be modeled by actual observed execution paths (the dynamic flows 128) and/or the variables 132 generated and/or tracked during those actual observed execution paths. As such, embodiments of the concepts and technologies disclosed herein can include predictively executing the static flow 132 by way of mapping the dynamic flows 128 to the static flows 132, thereby mapping actual observed execution of the data 110 to predicted execution of the data 110.

From operation 606, the method 600 proceeds to operation 608, where the computing device 102 determines if another static flow 132 exists to which to map the dynamic flows 128. As noted above, the computing device 102 can generate multiple static flows 132, which may be analyzed during the method 600. Thus, the computing device 102 can be configured to analyze each of the static flows 132 in turn, mapping dynamic flows 128 to the static flows 132 and then selecting a next static flow 132 for mapping. Thus, in operation 608, the computing device 102 can determine if each of the static flows 132 has been analyzed or not.

If the computing device 102 determines, in operation 608, that another static flow 132 exists to which to map the dynamic flows 128, the method 600 can return to operation 602, at which the computing device 102 can select another of the static flows 132. Thus, the computing device 102 can be configured to repeat operations 602-608 until the computing device 102 determines, in any iteration of operation 608, that another static flow 132 does not exist to which to map the dynamic flows 128. If the computing device 102 determines, in operation 608, that another static flow 132 does not exist to which to map the dynamic flows 128, the method 600 proceeds to operation 610.

In operation 610, the computing device 102 analyzes the mapped dynamic flows 128. In particular, the computing device can analyze the mapped dynamic flows 128 and associated variables 130 to identify dynamic flows 128 that have associated final output having a taint status of "tainted." If a dynamic flow 128 has an associated final output having a taint status of "tainted," the computing device 102 can determine that the various operations associated with the dynamic flow 128, and therefore the static flow 132 modeled by the dynamic flow 128, may not include any whitelisted operations or functions that render a tainted variable untainted. Thus, the computing device 102 can determine that these execution paths of the data 110 may correspond to vulnerabilities in the data 110. These vulnerabilities may be exploited by cross-site scripting attacks or other malicious attacks due to the failure of the code 110 to perform safe operations on these variables during the execution paths in question. Because the computing device 102 can analyze the mapped dynamic flows 128 in additional and/or alternative ways, it should be understood that these embodiments are illustrative, and should not be construed as being limiting in any way.

From operations 610, the method 600 proceeds to operation 612, where the computing device 102 identifies one or more vulnerabilities in the data 110. As noted above, if the computing device 102 identifies a taint status of "tainted" in the final output of a dynamic flow 128 and/or in a variable 130 when last referenced by the mapped dynamic flows 128, the computing device 102 can be configured to flag the static flows 132 to which these dynamic flows 128 map as being potentially unsafe. The computing device 102 can be configured to analyze the static flows 132 to identify false positives and/or false negatives. For example, the computing device 102 can determine that the static flows 132 are safe, although the final output of the mapped dynamic flow(s) 128 includes a taint status of "tainted," and/or that the static flows 132 are unsafe although the final output includes a taint status of "untainted."

According to various embodiments, the computing device 102 can be configured to perform additional analysis on the static flows 132 to exercise these potentially unsafe static flows 132. The computing device 102 can be configured to apply additional test cases to the static flows 132 to determine if the static flows 132 are safe or unsafe. Thus, the functionality described herein can be used to identify static flows 132 for which additional analysis is to be performed and/or to identify static flows 132 for which additional analysis is not necessary.

From operations 612, the method 600 proceeds to operation 614, where the computing device 102 outputs one or more alarms 134. The alarms 134 output in operation 614 can correspond to the one or more vulnerabilities identified in operation 612. Thus, for example, the computing device 102 can be configured to generate one or more alarms 134 for one or more, or each of the vulnerabilities identified. In some embodiments, the computing device 102 can be configured to output the one or more alarms 134 to an entity such as the user 136 shown in FIG. 1. In some other embodiments, the computing device 102 can be configured to report the alarms 134 to various entities and/or systems and/or to pass the alarms 134 to an alarm mechanism. These devices and/or entities can take corrective action such as modifying the data 110, performing additional analysis on the data 110, or the like. It should be understood that these embodiments are illustrative, and should not be construed as being limiting in any way.

From operation 614, the method 600 proceeds to operation 616. The method 600 ends at operation 616.

Figure 7:
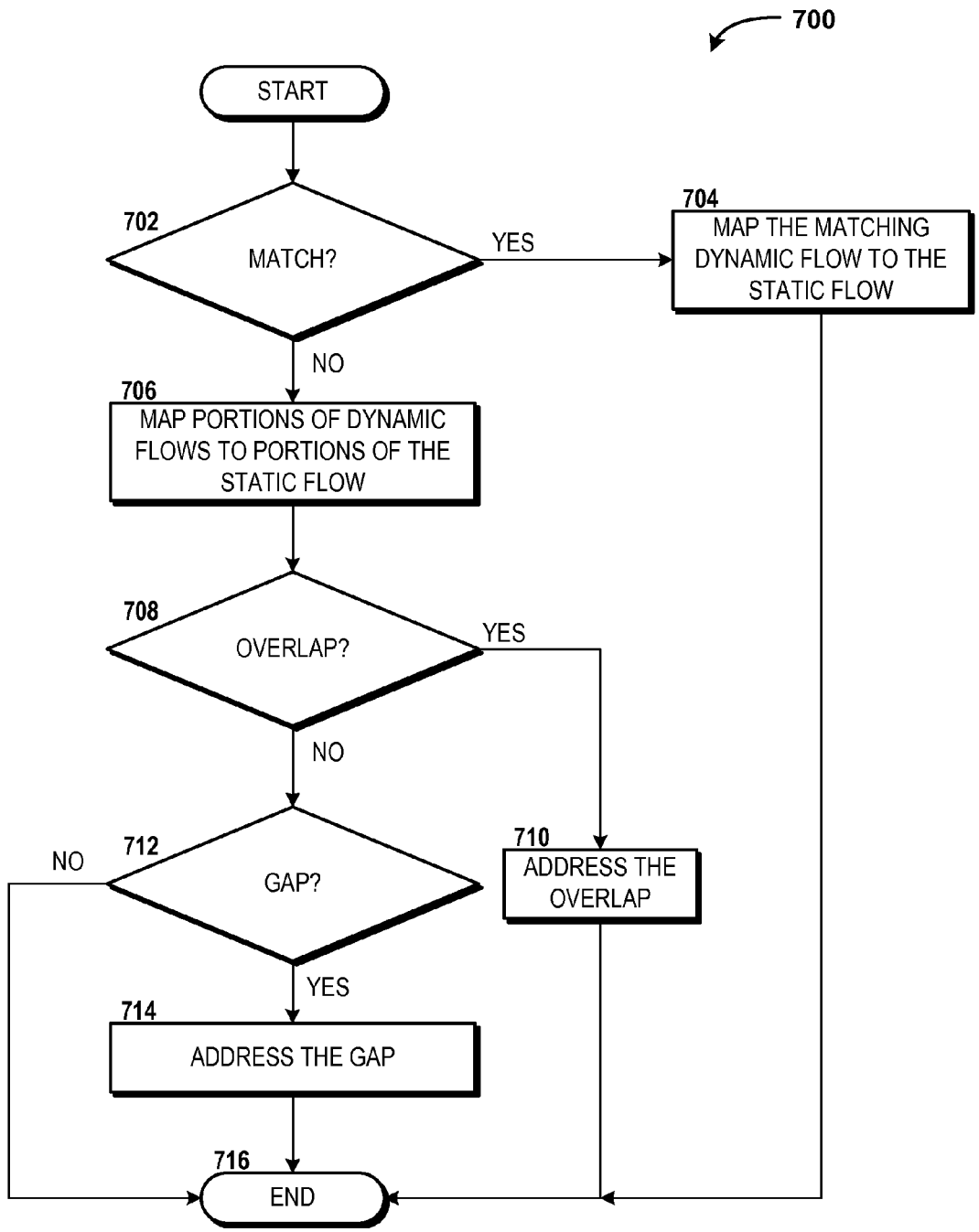
FIG. 7 is a flow diagram showing additional aspects of one method disclosed herein for mapping dynamic flows to static flows using an analysis tool, according to an embodiment.

Turning now to FIG. 7, aspects of a method 700 for mapping dynamic flows to static flows using an analysis tool are illustrated in detail. As mentioned above with reference to FIG. 6, the functionality described herein with reference to FIG. 7 can be, but is not necessarily, executed by the computing device 102 during execution of operation 606 of the method 600. The method 700 begins at operation 702, where the computing device 102 determines if the one or more dynamic flows 128 match the static flow 132. In particular, the computing device 102 can be configured to determine if the one or more dynamic flows 128 are an exact match for the static flow 132 in operation 702.

As will be explained in more detail below, dynamic flows 128 mapped to the static flow 132 may exactly match the static flow 132, may map to one or more portions of the static flow 132, and/or may partially overlap one another and match the static flow 132. The computing device 102 can determine, in operation 702, if the dynamic flows 128 are an exact match for the static flow 132 and/or if the dynamic flows 128 are not an exact match for the static flow 132. Thus, the computing device 102 can be configured to determine that the dynamic flows 128 are a match for the static flow 132 by determining that the dynamic flows 128 do not overlap one another and/or that all of the static flow 132 can be mapped to the one or more dynamic flows 128 and that a gap therefore does not exist. Because the computing device 102 can determine that the dynamic flows 128 match the static flow 132 in additional and/or alternative ways, it should be understood that these embodiments are illustrative, and should not be construed as being limiting in any way.

If the computing device 102 determines, in operation 702, that one of the dynamic flows 128 identified in operation 604 of the method 600 illustrated in FIG. 6 matches the static flow 132 exactly, the method 700 can proceed to operation 704. In operation 704, the computing device 102 can map the matching dynamic flow 128 to the static flow 132. If the computing device 102 determines, in operation 702, that one of the dynamic flows 128 identified in operation 604 of the method 600 illustrated in FIG. 6 does not match the static flow 132 exactly, the method 700 can proceed to operation 706.

In operation 706, the computing device 102 maps one or more portions of the one or more dynamic flows 128 identified in operation 604 of the method 600 illustrated in FIG. 6 to the static flow 132 selected in operation 602 of the method 600. The mapping of dynamic flows 128 to the static flows 132 has been explained in additional detail above. As noted above, one or more portions of the static flow 132 may or may not be matched by a mapped dynamic flow 128. As such, the computing device 102 can be configured to map the dynamic flows 128 to the static flows 132 and to analyze the mapped dynamic flows 128 to determine if any gaps or overlaps exist.

From operation 706, the method 700 proceeds to operation 708, where the computing device 102 determines if an overlap exists between two or more of the dynamic flows 128 mapped to the static flow 132. As noted above, the computing device 102 can determine that an overlap exists by determining that operations associated with one mapped dynamic flow 128 begin before operations of another mapped dynamic flow 128 end. An example of an overlap is illustrated and described with reference to FIG. 2C above.

If the computing device 102 determines, in operation 708, that an overlap exists between two or more dynamic flows 128 mapped to the static flow 132, the method 700 proceeds to operation 710. In operation 710, the computing device 102 can address the overlap. As explained in detail with reference to FIGS. 1-2D, the computing device 102 can address an overlap by rolling back recorded operations associated with the dynamic flow 128 that are overlapped by operations of a second dynamic flow 128; un-replay particular operations of the dynamic flow 128 that are overlapped by operations of a second dynamic flow 128; and/or truncating portions of a dynamic flow 128 that are overlapped by operations of another dynamic flow 128. Because the overlap can be addressed by the computing device 102 in additional and/or alternative ways, it should be understood that these embodiments are illustrative, and should not be construed as being limiting in any way.

If the computing device 102 determines, in operation 708, that an overlap does not exist between two or more dynamic flows 128 mapped to the static flow 132, the method 700 proceeds to operation 712. In operation 712, the computing device 102 can determine if a gap exists among the one or more dynamic flows 128 mapped to the static flow 132. In particular, the computing device 102 can determine if one or more portions of the static flow 132 is or are uncovered by the mapped dynamic flows 128. An example of a gap is illustrated and described above with reference to FIG. 2A.

If the computing device 102 determines, in operation 712, that a gap exists among the one or more dynamic flows 128 mapped to the static flow 132, the method 700 proceeds to operation 714. In operation 714, the computing device 102 can address the gap. As explained in detail with reference to FIGS. 1-2D, the computing device 102 can address a gap by ignoring the portion of the static flow 132 corresponding to the gap between the mapped dynamic flows 128 and/or by flagging as unsafe the portion of the static flow 132 corresponding to the gap between the mapped dynamic flows 128. The flagging of the gap can be used to alert a user or other entity that additional analysis may be performed for the static flow 132 and/or a portion thereof that is not addressed by the mapped dynamic flows 128. The computing device 102 also can be configured to predictively execute operations in the static flow 132 to simulate execution of the static flow 132. In some embodiments, the computing device 102 may be configured to predictively execute the static flows 132 notwithstanding an assumption that such predictive execution may not be accurate. Because the gap can be addressed by the computing device 102 in additional and/or alternative ways, it should be understood that these embodiments are illustrative, and should not be construed as being limiting in any way.

If the computing device 102 determines, in operation 712, that a gap does not exist among the one or more dynamic flows 128 mapped to the static flow 132, the method 700 proceeds to operation 716. The method 700 also can proceed to operation 716 from operations 704, 710 and 714. The method 700 ends at operation 716.

Although not explicitly shown in FIG. 7, it should be understood that the above-described functionality for mapping the dynamic flows 128 to the static flows 132 can be accomplished using a penalty function method. According to various embodiments of the concepts and technologies disclosed herein, the dynamic flows 128 can be mapped to the static flows 132 using various criteria, assigning weights to the criteria, generating a penalty score based upon the weights, and comparing the dynamic flows 128 and/or mapped sets of dynamic flows 128 based upon the weighted criteria. Based upon the penalty score, the dynamic flows 128 and/or a set of dynamic flows 128 can be selected for mapping to the static flows 132.

In some embodiments, the criteria can include, but are not limited to, a number of dynamic flows 128 and/or parts of dynamic flows 128 mapped to a static flow 132. The number of dynamic flows 128 and/or parts of dynamic flows 128 can indicate a reliability of the dynamic flows 128. In particular, the computing device 102 can be configured to determine that the higher the number of dynamic flows 128 and/or parts thereof, the less reliable the mapped dynamic flows 128 may be considered. Such an assumption may be based upon a recognition that higher numbers of dynamic flows 128 for a single static flow 132 may be less representative of an actual execution path and instead may be pieced together from multiple and/or possibly unrelated execution flows. It should be understood that this embodiment is illustrative, and should not be construed as being limiting in any way.

Another of the criteria that can be considered is the gap size. The "gap size" can refer to a number of instructions in a static flow 132 to which dynamic flows 128 are not mapped. Thus, the gap size can indicate a number of instructions in a static flow 132 for which a gap exists in the mapped dynamic flows 128. The computing device 102 also can be configured to consider overlap size. The "overlap size" can refer to a number of instructions in a static flow 132 to which multiple dynamic flows 128 are mapped.

The computing device 102 also can be configured to apply a risk of mismatched code criterion to the mapped dynamic flows 128. This risk of mismatched code criterion can define, for each gap or overlap, whether the instruction to which the overlap or gap corresponds is associated with a high risk or low risk instruction. According to some embodiments, a high risk instruction can correspond to an instruction that is associated with one of the document object models 116, that is associated with a web service call, or the like. A low risk instruction can include, for example, an operation for summing variables, or the like. It should be understood that these examples are illustrative, and should not be construed as being limiting in any way.

The computing device 102 can be configured to obtain a count and/or level associated with each of these criteria. Thus, the computing device 102 can be configured to identify a number of gaps, a number of overlaps, a number of flows, and/or a risk level associated with each of the dynamic flows 128 and/or for a set of dynamic flows 128. The computing device 102 also can be configured to assign a weight to each of the criteria and generate a penalty score based upon the weighted values and/or levels to generate a penalty score for the dynamic flows 128 and/or a set thereof.

According to some embodiments, the computing device 102 can be configured to assign a relatively high weight to the number of parts and/or number of flows in a subset of dynamic flows 128. The computing device 102 can be configured to assign the relatively high weight based upon an assumption that a model or representation of a static flow 132 may have increasing reliability as a number of dynamic flows 128 and/or parts thereof are decreased. The computing device 102 also can be configured to assign a relatively high weight to the number of gaps in the mapped dynamic flows 128. The computing device 102 can be configured to assign the relatively high weight based upon an assumption that gaps may pose a high risk for vulnerabilities.

In some embodiments, the computing device 102 can be configured to assign a relatively low weight to the number of overlaps in a subset of dynamic flows 128. The computing device 102 can be configured to assign the relatively low weight based upon an assumption that the overlaps pose less of a risk than the gaps and/or that the overlaps are relatively easy to address. The computing device 102 also can be configured to assign a relatively moderate weight to mismatched code. The computing device 102 can be configured to assign the relatively moderate weight based upon an assumption that an indication of high risk or low risk may be moderately useful in identifying vulnerabilities. It should be understood that these embodiments are illustrative, and should not be construed as being limiting in any way.

The computing device 102 can obtain values and/or levels for each of the criteria discussed herein, as well as others, and to generate a penalty score for each set of dynamic flows 128 by weighting the values and/or levels based upon the relative weights described hereinabove. According to some embodiments, the computing device 102 can be configured to select a set of the dynamic flows 128 based upon the penalty score, though this is not necessarily the case.

In particular, the computing device 102 can be configured to identify a best set of the dynamic flows 128 by applying one or more algorithms to the identified sets of dynamic flows 128. In one embodiment, the computing device 102 can be configured to apply a greedy algorithm to the dynamic flows 128 and/or the sets of dynamic flows 128 to identify the dynamic flow(s) 128 that cover the largest portion of the static flows 132. The computing device 102 can assign a dynamic flow 128 that covers a next-largest portion of the static flows 132 and continue this approach until the dynamic flows 128 are assigned to the static flows 132. In some instances, the greedy algorithm approach may optimize the mapping of the dynamic flows 128 to the static flows 132. In some other instances, however, the greedy algorithm approach may not optimize the mappings. In particular, it is possible that using the greedy algorithm approach will result in a longest dynamic flow 128 being assigned to a static flow 132 when the longest dynamic flow 128 may not be the best match, among the dynamic flows 128, for the static flow 132. Thus, the greedy algorithm may, but does not necessarily, yield the optimized mapping for the dynamic flows 128.

In some embodiments, the computing device 102 can be configured to use a dynamic programming solution to optimize the mappings. In applying the dynamic programming solution, the computing device 102 can be configured to generate a multidimensional matrix of partial solutions. The partial solutions can cover a subset of the dynamic flows 128 for which the penalty score has been calculated as explained above. The computing device 102 can be configured to assemble the dynamic flows 128 (or portions thereof) in a manner that minimizes the penalty score of the set of dynamic flows 128. The dynamic programming solution can yield an optimized set of dynamic flows 128, but may be expensive in terms of computing power, time, and/or other resource consumption. Thus, the dynamic programming solution may be used for a moderate number of dynamic flows 128.

In some other embodiments, the computing device 102 can be configured to use a covering algorithm. In particular, the computing device 102 can be configured to use covering algorithms such as those applied to genetic sequencing problems to assemble an optimized set of the dynamic flows 128. Because covering algorithms are generally understood, the covering algorithms and/or the application thereof to the dynamic flows 128 will not be described in additional detail herein. The above examples of mapping the dynamic flows 128 to the static flows 132 should be understood as being illustrative and should not be construed as being limiting in any way.

Figure 8:
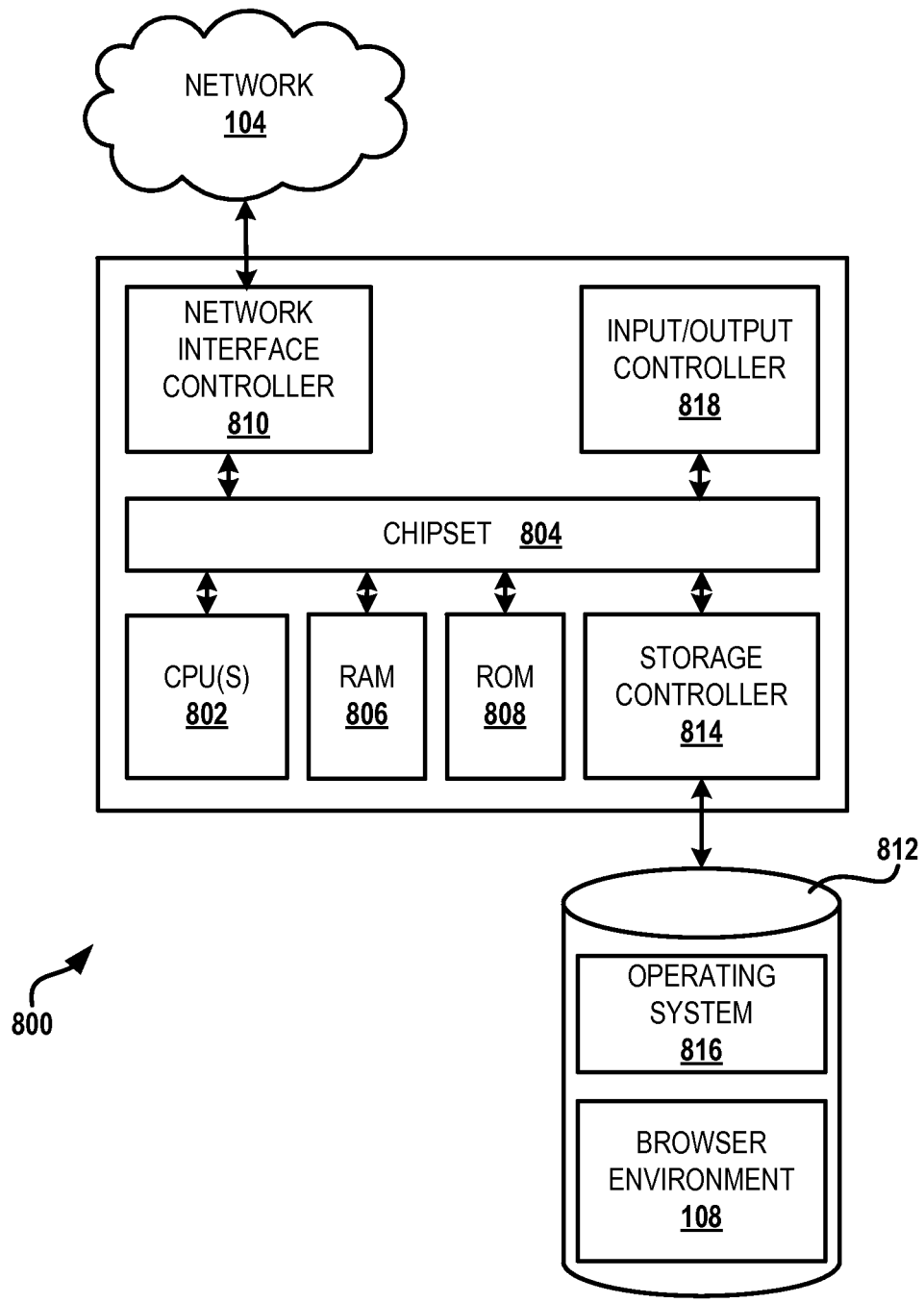
FIG. 8 is a computer architecture diagram showing an illustrative computer hardware architecture for implementing the various computing devices described in embodiments presented herein.

FIG. 8 shows an example computer architecture for a computer 800 capable of executing the software components described herein for providing an analysis tool for data security. The computer architecture shown in FIG. 8 illustrates a conventional server computer, workstation, desktop computer, laptop, network appliance, personal digital assistant ("PDA"), e-reader, digital cellular phone, or other computing device 102, and may be utilized to execute any aspects of the software components presented herein described as executing within the computing device 102 and/or other computing devices mentioned herein.

The computer 800 includes a baseboard, or "motherboard," which is a printed circuit board to which a multitude of components or devices may be connected by way of a system bus or other electrical communication paths. In one illustrative embodiment, one or more central processing units ("CPUs") 802 operate in conjunction with a chipset 804. The CPUs 802 are standard programmable processors that perform arithmetic and logical operations necessary for the operation of the computer 800.

The CPUs 802 perform the necessary operations by transitioning from one discrete, physical state to the next through the manipulation of switching elements that differentiate between and change these states. Switching elements may generally include electronic circuits that maintain one of two binary states, such as flip-flops and electronic circuits that provide an output state based on the logical combination of the states of one or more other switching elements, such as logic gates. These basic switching elements may be combined to create more complex logic circuits, including registers, adders-subtractors, arithmetic logic units, floating-point units and the like.

The chipset 804 provides an interface between the CPUs 802 and the remainder of the components and devices on the baseboard. The chipset 804 may provide an interface to a random access memory ("RAM") 806, used as the main memory in the computer 800. The chipset 804 may further provide an interface to a computer-readable storage medium such as a read-only memory ("ROM") 808 or non-volatile RAM ("NVRAM") for storing basic routines that that help to startup the computer 800 and to transfer information between the various components and devices. The ROM 808 or NVRAM may also store other software components necessary for the operation of the computer 800 in accordance with the embodiments described herein.

The computer 800 may operate in a networked environment using logical connections to remote computing devices and computer systems through the network 104. The chipset 804 may include functionality for providing network connectivity through a network interface controller ("NIC") 810, such as a gigabit Ethernet adapter. The NIC 810 is capable of connecting the computer 800 to other computing devices over the network 104. It should be appreciated that multiple NICs 810 may be present in the computer 800, connecting the computer to other types of networks and remote computer systems.

The computer 800 may be connected to a mass storage device 812 that provides non-volatile storage for the computer. The mass storage device 812 may store system programs, application programs, other program modules and data, which have been described in greater detail herein. The mass storage device 812 may be connected to the computer 800 through a storage controller 814 connected to the chipset 804. The mass storage device 812 may consist of one or more physical storage units. The storage controller 814 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 800 may store data on the mass storage device 812 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 812 is characterized as primary or secondary storage and the like.

For example, the computer 800 may store information to the mass storage device 812 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 may further read information from the mass storage device 812 by detecting the physical states or characteristics of one or more particular locations within the physical storage units.

In addition to the mass storage device 812 described above, the computer 800 may have access to other computer-readable storage medium to store and retrieve information, such as program modules, data structures, or other data. It should be appreciated by those skilled in the art that computer-readable storage media can be any available media that provides for the storage of non-transitory data and that may be accessed by the computer 800.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 812 may store an operating system 816 utilized to control the operation of the computer 800. According to one embodiment, the operating system includes a member of the LINUX family of operating systems. According to another embodiment, the operating system includes a member of the WINDOWS® SERVER family of operating systems from MICROSOFT Corporation in Redmond, Wash. According to further embodiments, the operating system may include a member of the UNIX or SOLARIS families of operating systems. It should be appreciated that other operating systems may also be utilized. The mass storage device 812 may store other system or application programs and data utilized by the computer 800 such as the analysis tool 126. The mass storage device 812 also can store data corresponding to the data 110, the browser environment 108, and/or other data stored and/or executed by the computing device 102, the server computer 112, and/or the data store 120 described herein.

In one embodiment, the mass storage device 812 or other computer-readable storage media is encoded with computer-executable instructions that, when loaded into the computer 800, transform the computer from a general-purpose computing system into a special-purpose computer capable of implementing the embodiments described herein. These computer-executable instructions transform the computer 800 by specifying how the CPUs 802 transition between states, as described above. According to one embodiment, the computer 800 has access to computer-readable storage media storing computer-executable instructions which, when executed by the computer 800, perform aspects of one or more of the methods 300-700 described with reference to FIGS. 3-7, respectively.

The computer 800 may also include an input/output controller 818 for receiving and processing input from a number of input devices, such as a keyboard, a mouse, a touchpad, a touch screen, an electronic stylus, or other type of input device. Similarly, the input/output controller 818 may provide output to a display, such as a computer monitor, a flat-panel display, a digital projector, a printer, a plotter, or other type of output device. It will be appreciated that the computer 800 may not include all of the components shown in FIG. 8, may include other components that are not explicitly shown in FIG. 8, or may utilize an architecture completely different than that shown in FIG. 8.

Based on the foregoing, it should be appreciated that technologies for an analysis tool for data security have been presented herein. Although the subject matter presented herein has been described in language specific to computer structural features, methodological acts and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A computer-implemented method for analyzing data to determine data security, the method comprising computer-implemented operations for:
   obtaining the data to be tested, the data comprising a client-side script and a document;
   performing, using an analysis tool executing at a computing device, a dynamic analysis of a first portion of the data by executing test execution flows against the first portion of the data;
   tracking, during the dynamic analysis, dynamic execution flows corresponding to the test execution flows and variable values associated with variables referenced during the test execution flows;
   performing, using the analysis tool, a static analysis of the same first portion of the data analyzed using the dynamic analysis to determine static flows corresponding to execution paths associated with the first portion of the data;
   building a model of one of the static flows by mapping at least a portion of one of the dynamic execution flows to at least a portion of the one of the static flows;
   analyzing the model to determine if a variable associated with the model has a taint status determined to be unsafe when last referenced in the model; and
   identifying a vulnerability in the first portion of the data corresponding to the one of the static flows, in response to determining the variable has the taint status.

2. The method of claim 1, further comprising:
   generating an alarm identifying the vulnerability; and
   outputting the alarm to trigger corrective action for the vulnerability.

3. The method of claim 1, wherein mapping the at least a portion of the dynamic execution flows comprises:
   identifying the dynamic execution flows by determining that the at least a portion of the one of the dynamic execution flows matches the at least a portion of the one of the static flows;
   determining that one of the dynamic execution flows matches the one of the static flows; and
   in response to determining that the one of the dynamic execution flows matches the one of the static flows, mapping the one of the dynamic execution flows to the one of the static flows.

4. The method of claim 1, further comprising:
 determining that an overlap exists between two or more mapped dynamic execution flows; and
 taking an action to address the overlap.

5. The method of claim 1, further comprising:
 determining that a gap exists between two mapped dynamic execution flows,
 taking an action with respect to the gap, the action comprising at least one of ignoring the gap, flagging the gap as unsafe, or performing additional analysis on a portion of the one of the static flows corresponding to the gap to determine if the one of the static flows is safe or unsafe, and
 if the gap does not exist, welding the two mapped dynamic execution flows.

6. The method of claim 1, further comprising:
 identifying multiple dynamic execution flows that match the at least a portion of the one of the static flows;
 identifying, among the multiple dynamic execution flows, a dynamic execution flow having a longest length; and
 mapping the dynamic execution flow having the longest length to the at least a portion of the one of the static flows.

7. The method of claim 1, further comprising:
 identifying multiple dynamic execution flows that match the at least a portion of the one of the static flows;
 identifying multiple mapping scenarios for mapping the multiple dynamic execution flows to the at least a portion of the one of the static flows;
 identifying a one of the multiple mapping scenarios having a fewest number of gaps or overlaps; and
 selecting the one of the multiple mapping scenarios.

8. The method of claim 1, further comprising:
 analyzing multiple mapping scenarios for mapping the dynamic execution flows to the static flows;
 assigning a penalty to each of the multiple mapping scenarios for each gap or each overlap among the dynamic execution flows included in each of the multiple mapping scenarios;
 identifying one of the multiple mapping scenarios having a lowest number of penalties; and
 mapping the dynamic execution flows to the static flows in accordance with the one of the multiple mapping scenarios having the lowest number of penalties.

9. A computer-implemented method for analyzing data to determine data security, the method comprising computer-implemented operations for:
 obtaining, at a computing device executing an analysis tool, data to be tested for vulnerabilities, the data comprising a script;
 performing, using the analysis tool, a dynamic analysis of a first portion of the data by executing test execution flows against the first portion of the data;
 tracking, during the dynamic analysis, dynamic execution flows corresponding to the test execution flows;
 performing, using the analysis tool, a static analysis of the same first portion of the data analyzed using the dynamic analysis to determine static execution flows corresponding to execution paths associated with the first portion of the data;
 building a model of one of the static flows by mapping at least a portion of one of the dynamic execution flows to at least a portion of one of the static flows; and
 analyzing the model to determine if the data includes a vulnerability.

10. The method of claim 9, further comprising tracking, during the dynamic analysis, variable values of variables referenced during the test execution flows.

11. The method of claim 10, wherein determining if the data includes the vulnerability comprises:
 evaluating a taint status of a variable the last time the variable is referenced within the model; and
 identifying a vulnerability in the data corresponding to the static flow, in response to determining that the variable has a taint status of tainted the last time the variable is referenced within the model.

12. The method of claim 10, wherein tracking the variable values referenced during the test execution flows comprises:
 assigning an identifier to a variable referenced in the test execution flows and initializing the variable with a taint status of tainted;
 identifying, in a first operation of the test execution flows, a reference to the variable based, at least partially, upon the identifier;
 tracking the reference, a value associated with the variable, the taint status, and the identifier;
 identifying, in a second operation of the test execution flow, a further reference to the variable;
 tracking the further reference, a further value associated with the variable at the further reference, a further taint status associated with the variable at the further reference, and the identifier; and
 outputting the tracked information in a trace log.

13. The method of claim 9, further comprising tracking, during the dynamic analysis, variable values of variables referenced during the test execution flows and propagation of the variables through multiple static flows during execution of the data.

14. The method of claim 9, wherein the data comprises a document object model corresponding to web page and a script comprising executable code for display with the web page.

15. The method of claim 14, wherein executing the data comprises:
 executing the script in a virtual machine executing a script runtime environment; and
 rendering the document object model in a browser environment in which the analysis tool is executed.

16. The method of claim 9, wherein performing the static analysis comprises:
 analyzing the data to identify possible execution paths associated with the data; and
 outputting further data as the static flows, the further data identifying the possible execution paths.

17. The method of claim 16, further comprising:
 determining that the possible execution paths include duplicative operations; and
 in response to determining that the possible execution paths include the duplicative operations, transforming the duplicative operations to simplify a number of static flows.

18. The method of claim 16, further comprising sampling the possible execution paths.

19. A non-transitory computer storage medium having computer executable instructions stored thereon that, when executed by a computer, cause the computer to:
 obtain data to be tested for vulnerabilities, the data comprising a document object model and a script;
 perform a dynamic analysis of a first portion of the data by executing test execution flows against the first portion of the data;

track, during the dynamic analysis, dynamic execution flows;

perform a static analysis of the same first portion of the data analyzed using the dynamic analysis to identify static flows corresponding to possible execution paths for interacting with the first portion of the data;

build a model of one of the static flows by mapping at least a portion of one of the dynamic execution flows to at least a portion of one of the static flows; and analyzing the model to determine if the data includes a vulnerability.

20. The computer storage medium of claim 19, further comprising computer executable instructions that, when executed by the computer, cause the computer to:

track, during the dynamic analysis, variable values of variables referenced during the test execution flows.

21. The computer storage medium of claim 20, further comprising computer executable instructions that, when executed by the computer, cause the computer to:

analyze the model to evaluate a variable referenced within the model;

determine that the variable has a taint status indicating that the variable is unsafe at a last time the variable is referenced within the model; and identify a vulnerability in the data corresponding to the static flow, in response to determining that the variable has the taint status.

22. The computer storage medium of claim 19, further comprising computer executable instructions that, when executed by the computer, cause the computer to:

install the analysis tool at the computer, the analysis tool comprising a component of a browser environment including a script runtime environment and the analysis tool.

23. The computer storage medium of claim 22, wherein the analysis tool comprises a component of a browser application, and wherein installing the analysis tool comprises installing an update for the browser application.

24. The computer storage medium of claim 22, wherein the analysis tool comprises an extension.

25. A system comprising:

a processor; and a memory storing computer-executable instructions that, when executed by the processor, cause the processor to obtain data to be tested for vulnerabilities, the data comprising a document and a script, perform a static analysis of a first portion of the data to determine static execution flows corresponding to execution paths associated with the first portion of the data, build a model of one of the static execution flows by mapping at least a portion of a dynamic execution flow to at least a portion of one of the static execution flows, wherein the dynamic execution flow is generated by performing a dynamic analysis of the same first portion of the data analyzed using the static analysis, and analyze the model to determine if the data includes a vulnerability.

26. The system of claim 25, wherein the computer-executable instructions, when executed by the processor, cause the processor to:

generate the dynamic execution flow by performing a dynamic analysis of the data by executing test execution flows against the data, and track, during the dynamic analysis, dynamic execution flows corresponding to the test execution flows, the dynamic execution flows comprising the at least a portion of the dynamic execution flow.

27. The system of claim 26, wherein the computer-executable instructions, when executed by the processor, cause the processor to:

track, during the dynamic analysis, variable values of variables referenced during the test execution flows, analyze the model to evaluate a variable referenced within the model, determine that the variable has a taint status indicating that the one of the dynamic execution flows is unsafe a last time the variable is referenced within the model, and identify a vulnerability in the data corresponding to the static flow, in response to determining that the variable has the taint status.

28. The system of claim 27, wherein the computer-executable instructions, when executed by the processor, cause the processor to:

track, during the dynamic analysis, first values of a first variable referenced during a first of the test execution flows and second values of a second variable referenced during a second of the test execution flows, determine that the second variable is equivalent to the first variable, determine that the second variable has a taint status of tainted a last time the second variable is referenced within the model, and identify a vulnerability in the data corresponding to at least one of the first variable or the second variable, in response to determining that the second variable has the taint status.

* * * * *